US012738868B2

(12) United States Patent
Watabe

(10) Patent No.: US 12,738,868 B2
(45) Date of Patent: Sep. 15, 2026

(54) POWER GENERATION DEVICE

(71) Applicant: DENSO TEN Limited, Kobe (JP)

(72) Inventor: Hiroyuki Watabe, Kobe (JP)

(73) Assignee: DENSO TEN Limited, Kobe (JP)

( * ) Notice: Subject to any disclaimer, the term of this patent is extended or adjusted under 35 U.S.C. 154(b) by 271 days.

(21) Appl. No.: 18/690,965

(22) PCT Filed: Mar. 30, 2022

(86) PCT No.: PCT/JP2022/016219
§ 371 (c)(1),
(2) Date: Mar. 11, 2024

(87) PCT Pub. No.: WO2023/188176
PCT Pub. Date: Oct. 5, 2023

(65) Prior Publication Data
US 2024/0380339 A1 Nov. 14, 2024

(51) Int. Cl.
*H02N 11/00* (2006.01)
*H02K 3/04* (2006.01)
*H02K 7/18* (2006.01)

(52) U.S. Cl.
CPC ............ *H02N 11/002* (2013.01); *H02K 3/04* (2013.01); *H02K 7/1807* (2013.01)

(58) Field of Classification Search
CPC ........ H02K 3/04; H02K 7/1807; H02K 33/18; H02N 11/002
USPC .............................................. 310/12.16, 208
See application file for complete search history.

(56) References Cited

U.S. PATENT DOCUMENTS

| | | | | |
|---|---|---|---|---|
| 5,003,610 A * | 3/1991 | Adachi | H04R 9/047 | 381/431 |
| 5,719,451 A * | 2/1998 | Cook | H02K 33/16 | 318/135 |
| 5,973,422 A * | 10/1999 | Clamme | H02K 33/16 | 310/90.5 |
| 6,903,474 B2 * | 6/2005 | An | H04R 9/066 | 310/15 |
| 7,550,880 B1 * | 6/2009 | Pusl | H02K 33/06 | 310/15 |
| 11,646,631 B2 * | 5/2023 | McMullen | H02P 29/40 | 310/168 |
| 2004/0145258 A1 * | 7/2004 | An | H04R 9/066 | 310/81 |
| 2009/0315433 A1 * | 12/2009 | Siraky | H02K 11/21 | 310/68 B |

(Continued)

FOREIGN PATENT DOCUMENTS

| | | |
|---|---|---|
| JP | H10-74426 A | 3/1998 |
| JP | 2000-032732 A | 1/2000 |

(Continued)

*Primary Examiner* — Rashad H Johnson
(74) *Attorney, Agent, or Firm* — Oliff PLC

(57) ABSTRACT

A power generation device includes a coil, a magnet, and a diaphragm. The magnet is provided at a position distant from the coil, having magnet pole faces facing a direction of the coil. The diaphragm vibrates upon receiving a sound wave, having either the coil or the magnet being placed. The diaphragm generates power by generating an electromotive force in the coil by a change in a magnetic field of the coil caused by changing a relative position of the coil and the magnet by vibration.

11 Claims, 8 Drawing Sheets

(56) References Cited

U.S. PATENT DOCUMENTS

| | | | | |
|---|---|---|---|---|
| 2010/0102646 | A1* | 4/2010 | Masami | H02K 33/16<br>310/29 |
| 2013/0026867 | A1* | 1/2013 | Deguchi | H02K 9/197<br>310/53 |
| 2013/0249323 | A1* | 9/2013 | Backes | H01F 7/1646<br>310/12.16 |
| 2015/0288269 | A1* | 10/2015 | Ruff | H02K 35/04<br>310/36 |
| 2024/0380339 | A1* | 11/2024 | Watabe | H04R 11/04 |

FOREIGN PATENT DOCUMENTS

| | | | |
|---|---|---|---|
| JP | 2012-165129 | A | 8/2012 |
| JP | 2022-49628 | A | 3/2022 |

* cited by examiner

POWER GENERATION DEVICE

CROSS-REFERENCE TO RELATED APPLICATIONS

This application is national stage application of International Application No. PCT/JP2022/016219, filed on Mar. 30, 2022, which designates the United States, the entire contents of which are incorporated herein by reference.

FIELD

The present invention relates to a power generation device that generates electricity from sound.

BACKGROUND

Conventionally, there is a power generation device known to generate power by changing the magnetic flux of a coil due to a change in the relative position of a permanent magnet and the coil.

CITATION LIST

Patent Literature

Patent Literature 1: Japanese Patent Application Laid-open No. 2000-32732

SUMMARY

Technical Problem

However, conventional technologies have focused on generating electricity from mechanical movement such as rotational motion, and there is room for improvement in terms of enabling efficient power generation from sound.

The present invention is designed in view of the aforementioned circumstances, and it is an object thereof to provide a power generation device capable of enabling efficient power generation from sound.

Solution to Problem

A power generation device includes a coil, a magnet, and a diaphragm. The magnet is provided at a position distant from the coil, having magnet pole faces facing a direction of the coil. The diaphragm vibrates upon receiving a sound wave, having either the coil or the magnet being placed. The diaphragm generates power by generating an electromotive force in the coil by a change in a magnetic field of the coil caused by changing a relative position of the coil and the magnet by vibration.

Advantageous Effects of Invention

According to the present invention, it is possible to enable efficient power generation from sound.

DESCRIPTION OF EMBODIMENTS

Hereinafter, an embodiment of a power generation device disclosed herein will be described in detail with reference to the accompanying drawings. Note that the present invention is not limited by the following embodiment.

Figure 1A:
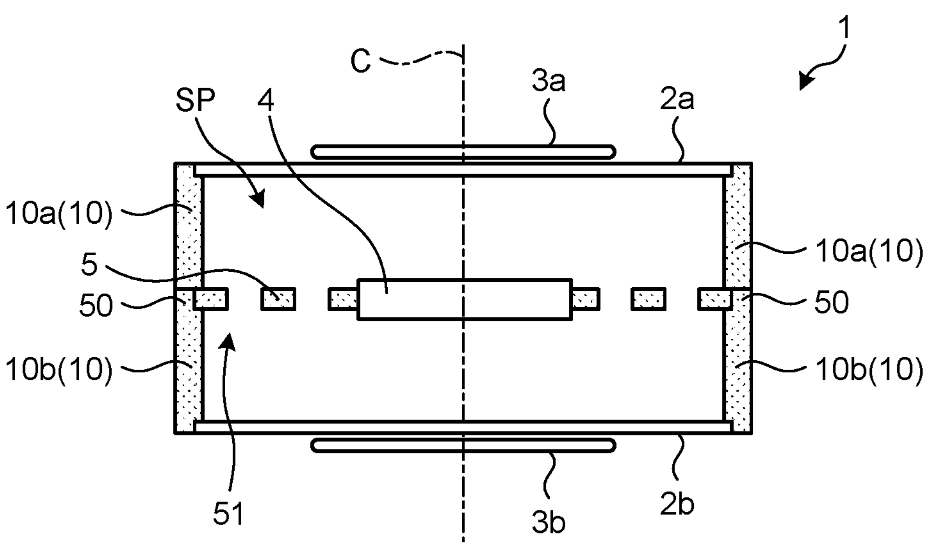
FIG. 1A is a diagram illustrating an example of an overall configuration of a power generation device according to an embodiment.
Figure 1B:
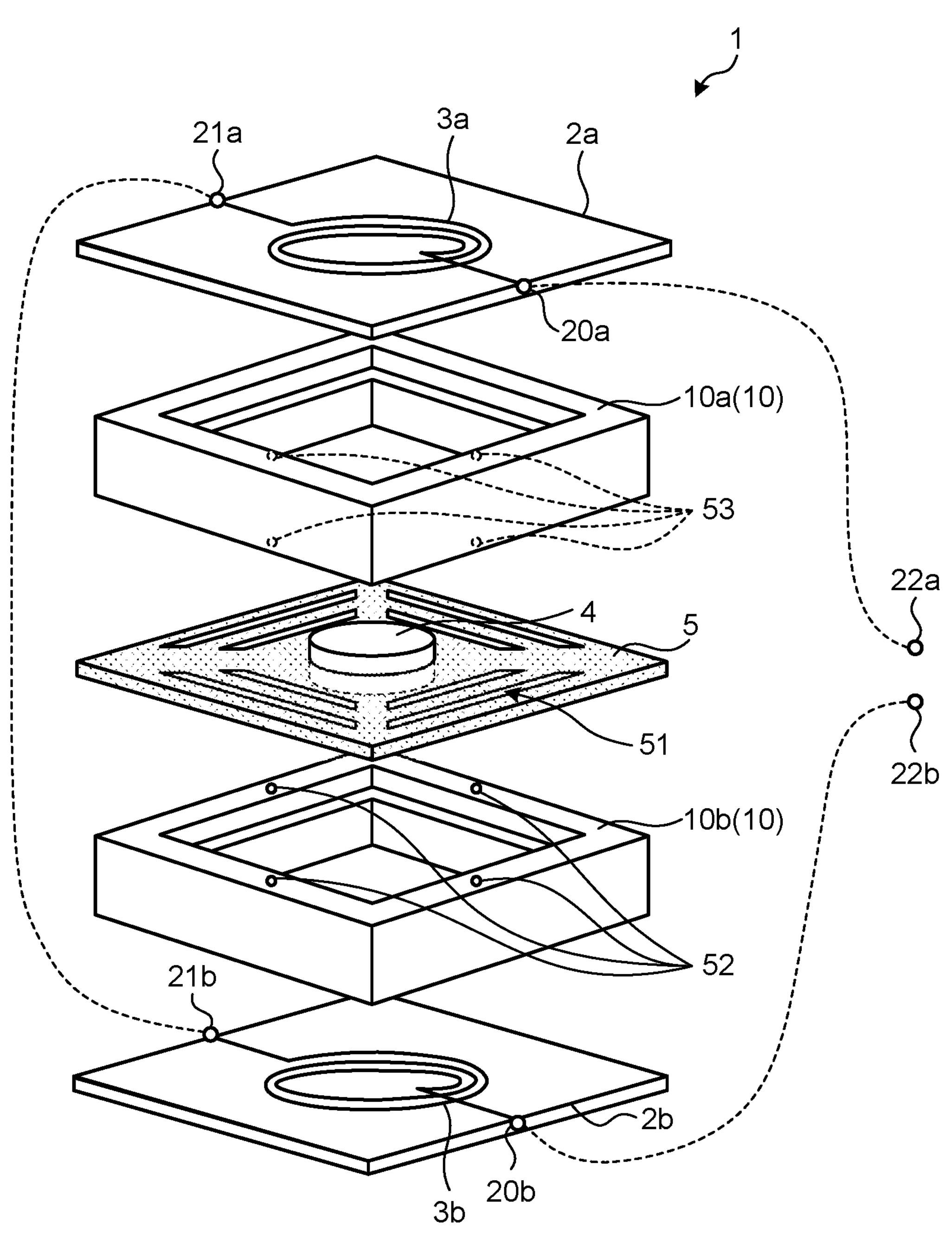
FIG. 1B is a diagram illustrating the example of the overall configuration of the power generation device according to the embodiment.

First, an example of an overall configuration of the power generation device according to the embodiment will be described by referring to FIG. 1A and FIG. 1B. FIG. 1A and FIG. 1B are diagrams illustrating an example of the overall configuration of the power generation device according to the embodiment. FIG. 1A illustrates a side view of a power generation device 1, and FIG. 1B illustrates an exploded perspective view of the power generation device 1.

As illustrated in FIG. 1A and FIG. 1B, the power generation device 1 according to the embodiment includes a first diaphragm 2*a*, a second diaphragm 2*b*, a first coil 3*a*, a second coil 3*b*, a magnet 4, a fixing plate 5, and a chassis 10. In the following description, the first diaphragm 2*a* and the second diaphragm 2*b* may be referred to collectively as a diaphragm 2, and the first coil 3*a* and the second coil 3*b* may be referred to collectively as a coil 3.

The diaphragm 2 is a vibration member that vibrates upon receiving sound waves, and it is formed in a thin plate-like and substantially square shape in the present disclosure. Furthermore, the diaphragm 2 has both ends of the outer peripheral edges fixed to sidewalls 50 of the chassis 10 by a fixing member such as an adhesive or the like. Specifically, the diaphragm 2 is fixed to be in a flat state (state illustrated in FIG. 1A) when not receiving sound waves. The diaphragm 2 is formed, for example, with a thin sheet (film) of paper, resin, or the like having moderate rigidity property and elastic property.

Furthermore, as illustrated in FIG. 1A, as for the diaphragm 2, the first diaphragm 2*a* and the second diaphragm 2*b* are disposed facing each other. Thus, an internal space SP surrounded by the first diaphragm 2*a*, the second diaphragm 2*b*, and the sidewalls 50 comes to be in a sealed state. That is, a sealed space is formed with the first diaphragm 2*a* and the second diaphragm 2*b*.

While FIG. 1A illustrates an example where, as the diaphragm 2, the first diaphragm 2*a* and the second diaphragm 2*b* are disposed facing each other with the magnet 4 sandwiched therebetween, only one of the first diaphragm 2*a* and the second diaphragm 2*b* may be disposed as longs as the internal space is configured to be a sealed space. That is, the diaphragm 2 may be configured with two diaphragms or a single diaphragm.

The coil 3 is placed in each of the diaphragms 2, and it is formed by embedding a metallic conductor such as copper in the diaphragm 2, or by printing a conductive material on the diaphragm 2, for example. Specifically, as for the coil 3, the first coil 3*a* is disposed in the center of the first diaphragm 2*a*, and the second coil 3*b* is disposed in the center of the second diaphragm 2*b*.

The magnet 4 is, for example, a permanent magnet such as a neodymium magnet. The magnet 4 is provided at a position distant from the coil 3 in the vibration direction of the diaphragm 2, with the magnetic pole faces facing toward the direction of the coil 3. Furthermore, the magnet 4 is disposed at a position that is at an equal distance from each of the first coil 3*a* and the second coil 3*b*. The magnet 4 has both ends of the outer peripheral edges fixed to the fixing plate 5 by a fixing member such as an adhesive. Note that the magnet 4 may have both ends of the outer peripheral edges fitted and fixed to the fixing plate 5.

The positional relationship of the coil 3 and the magnet 4 may be interchanged. That is, the magnet 4 may be provided on each of the diaphragms 2, and the coil 3 may be fixed to the fixing plate 5. In this case, in regards to the polarity of each of the magnets 4, the same polarity may face each other or different polarities may face each other. However, considering that the larger magnetic flux change in the coil 3 during vibration of the diaphragm 2 is better, it is preferable to place the magnet 4 on each of the diaphragms 2 with the same polarity facing each other.

The fixing plate 5 is a plate-like member to which the magnet 4 is fixed, and it is located at a position distant from the coil 3 in the vibration direction of the diaphragm 2. As illustrated in FIG. 1A, the fixing plate 5 is disposed between the first diaphragm 2*a* and the second diaphragm 2*b* while facing each of the diaphragms 2.

For example, the fixing plate 5 has both ends of the outer peripheral edges fixed to the sidewalls 50. The fixing plate 5 is, for example, configured with a rigid material such as a resin material or the like. Furthermore, the fixing plate 5 has a hole part 51. In FIG. 1B, the fixing plate 5 has four hole parts 51 formed to be point symmetrical with respect to the magnet 4.

Specifically, the fixing plate 5 has the hole parts 51 that allow the internal space SP, which is a sealed space, to contact both the first diaphragm 2*a* and the second diaphragm 2*b* to be an integrated space.

The chassis 10 is a fixing member that fixes the diaphragm 2 and the fixing plate 5 to the sidewalls 50. The chassis 10 is, for example, configured with a rigid material such as resin or a non/low-magnetic metal. In the present disclosure, the chassis 10 is formed by stacking an upper chassis 10*a* and a lower chassis 10*b*.

The upper chassis 10*a* has a stepped shape in which the inner peripheral part where the first diaphragm 2*a* is fixed is recessed by the thickness of the first diaphragm 2*a*. The first diaphragm 2*a* is bonded and fixed in a state of being fitted into the stepped shape.

Furthermore, the lower chassis 10*b* has a stepped shape in which the inner peripheral part where the fixing plate 5 is fixed is recessed by the thickness of the fixing plate 5. The fixing plate 5 is bonded and fixed in a state of being fitted into the stepped shape. That is, the fixing plate 5 is fixed to the sidewalls 50 in the lower chassis 10*b*. Furthermore, the lower chassis 10*b* has a stepped shape in which the inner peripheral part where the second diaphragm 2*b* is fixed is recessed by the thickness of the second diaphragm 2*b*. The second diaphragm 2*b* is bonded and fixed in a state of being fitted into the stepped shape.

Furthermore, a positioning protrusion part 52 or a positioning hole 53 is provided on the faces of the upper chassis 10*a* and the lower chassis 10*b* facing each other. This makes it possible to easily align the positions of the upper chassis 10*a* and the lower chassis 10*b* by fitting the protrusion part 52 and the positioning hole 53 during manufacturing.

While the present disclosure presents the example where the chassis 10 is configured with two members that are the upper chassis 10*a* and the lower chassis 10*b*, the chassis 10 may also be configured with a single member. Such a case can be achieved by providing a stepped shape for fixing the first diaphragm 2*a* and the second diaphragm 2*b* at both ends of the chassis 10 and providing a recess for fixing the fixing plate 5 in the center on the inner side of the sidewalls.

Figure 2:
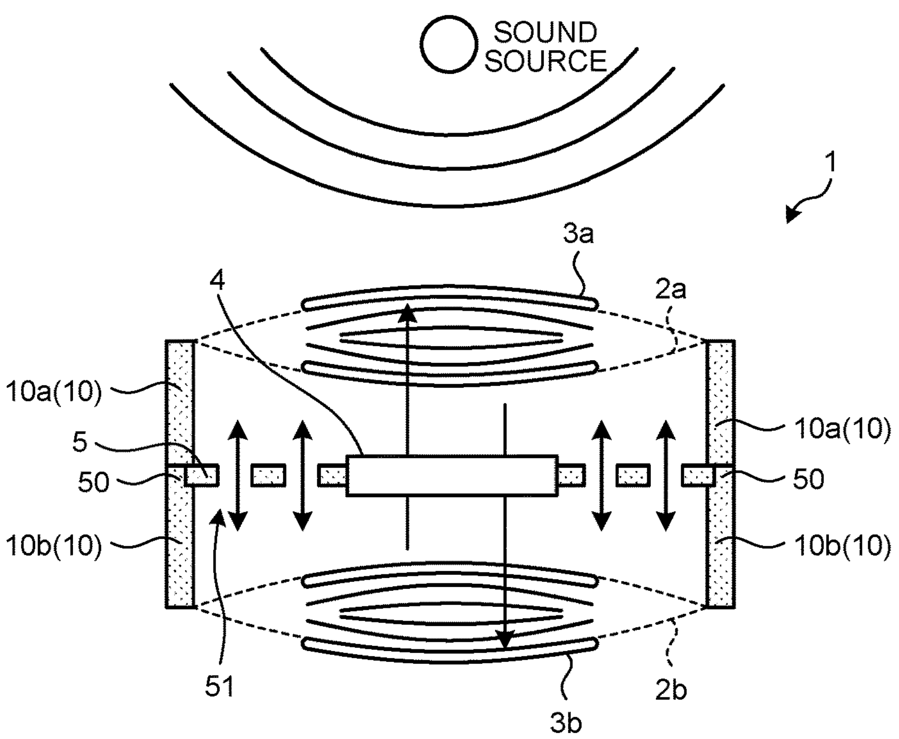
FIG. 2 is an explanatory diagram for describing the power generation principle of the power generation device.
Figure 3:
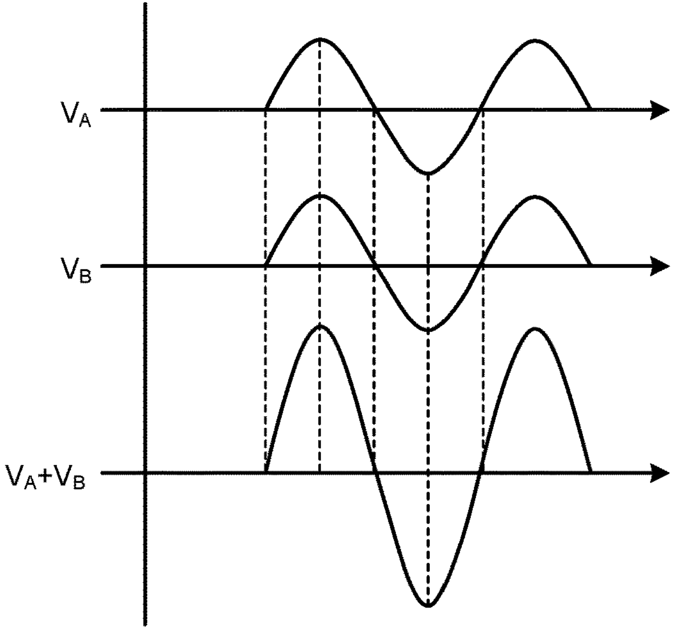
FIG. 3 is an explanatory diagram for describing the power generation principle of the power generation device.

Here, the power generation principle of the power generation device 1 according to the embodiment will be described by referring to FIG. 2 and FIG. 3. FIG. 2 and FIG. 3 are explanatory diagrams for describing the power generation principle of the power generation device 1. Note that a variety of sound-producing sources can be assumed as the sound source illustrated in FIG. 2. For example, when installing the power generation device 1 in a vehicle, it is preferable to use the engine or the like that generates sound regularly in the vehicle as a target sound source and to install the power generation device 1 at an appropriate position (position with good power generation efficiency) and in an appropriate state (state with good power generation efficiency (direction or the like)) for the target sound source.

As illustrated in FIG. 2, first, the diaphragm 2 upon receiving sound waves from the sound source vibrates. In FIG. 2, the sound waves from the sound source, that is, air pressure fluctuations (air density change) propagate to the first diaphragm 2*a*, causing the air pressure on the side of the sound source in the first diaphragm 2*a* to fluctuate. Then, the first diaphragm 2*a* vibrates due to the air pressure fluctuation on the side of the sound source in the first diaphragm 2*a*.

Subsequently, the vibration of the first diaphragm 2*a* generates pressure fluctuations on the anti-source side in the first diaphragm 2*a*, and the pressure fluctuations are propagated to the second diaphragm 2*b* through the internal space SP of the power generation device 1, that is, through the hole parts 51 of the fixing plate 5. The air pressure fluctuation propagated to the second diaphragm 2*b* causes the air pressure on the sound source side in the second diaphragm 2*b* to fluctuate, thereby causing the second diaphragm 2*b* to vibrate. Note that the inner space SP does not need to be completely sealed, and simply need to be sealed to the extent that such pressure fluctuations are sufficiently propagated to the second diaphragm 2*b*.

That is, as illustrated FIG. 2, when the first diaphragm 2*a* becomes a curved shape to be in a convex form toward the sound source side, the second diaphragm 2*b* also becomes a curved shape to be in a convex form toward the sound source side. Furthermore, when the first diaphragm 2*a* becomes a curved shape to be in a concave form toward the sound source side, the second diaphragm 2*b* also becomes a curved shape to be in a concave form toward the sound source side.

As a result, the sound waves from the sound source cause the first diaphragm 2*a* to vibrate, thereby changing the relative position of the first coil 3*a* and the magnet 4. Then, the magnetic flux change in the first coil 3*a* area caused thereby generates an electromotive force in the first coil 3*a*, which enables power generation. Furthermore, the air pressure fluctuation caused by the vibration of the first diaphragm 2*a* is propagated to the second diaphragm 2*b*, which causes the second diaphragm 2*b* to vibrate and changes the relative position of the second coil 3*b* and the magnet 4. Then, the magnetic flux change in the second coil 3*b* area caused thereby generates an electromotive force in the second coil 3*b*, which enables power generation.

Thus, with the power generation device 1 according to the embodiment, power is generated in the first coil 3*a* and the second coil 3*b* by the sound waves from the sound source, which makes it possible to enable efficient power generation from the sound.

Next, FIG. 3 is used to describe the principle of doubling the generated voltage by having the voltage VA generated by the first coil 3*a* and the voltage VB generated by the second coil 3*b* to be in the same phase. Note that, as illustrated in FIG. 1B, the first coil 3*a* and the second coil 3*b* are wound in a clockwise direction from the outer side to the inner side when viewed from the above in the drawing. Furthermore, as for the first coil 3*a* and the second coil 3*b*, a terminal 21*a* and a terminal 21*b* on the left side of the drawing are connected, and a terminal 20*a* and a terminal 20*b* on the right side of the drawing are connected to an output terminal 22*a* and an output terminal 22*b* for the power, respectively. A power output destination device (storage battery or the like) is connected to the output terminal 22*a* and the output terminal 22*b*. It is also assumed that the magnet 4 is placed with the N-pole on the upper side of the drawing and the S-pole on the lower side.

In such a case, when the first diaphragm 2*a* becomes a curved shape to be in a concave form to the sound source side, the first coil 3*a* moves closer to the magnet 4, which strengthens the upward magnetic field lines. Furthermore, when the second diaphragm 2*b* becomes a curved shape to be in a concave form to the sound source side, the second coil 3*b* moves away from the magnet 4, which weakens the upward magnetic field lines.

As a result, in the first coil 3*a*, an electric current flows in the direction in which the downward magnetic field lines are generated. That is, an electromotive force is generated such that an electric current flows from the terminal 21*a* to the terminal 20*a*, of the first coil 3*a*. Furthermore, in the second coil 3*b*, an electric current flows in the direction in which the upward magnetic field lines are generated. That is, an electromotive force is generated such that an electric current flows from the terminal 20*b* to the terminal 21*b*, of the second coil 3*b*. Therefore, there are two coils (the first coil 3*a* and the second coil 3*b*) that are connected in series and generate an electromotive force of the same polarity existing between the output terminal 22*a* and the output terminal 22*b*, and the sum of the voltages of the electromotive forces of both coils are to be generated between the output terminal 22*a* and the output terminal 22*b*. In this case, the output terminal 22*a* is positive and the output terminal 22*b* is negative in polarity.

Furthermore, when the first diaphragm 2*a* becomes a curved shape to be in a convex form to the sound source side, the first coil 3*a* moves away from the magnet 4, which weakens the upward magnetic field lines. When the second diaphragm 2*b* becomes a curved shape to be in a convex form to the sound source side, the second coil 3*b* moves closer to the magnet 4, which strengthens the upward magnetic field lines As a result, in the first coil 3*a*, an electric current flows in the direction in which the upward magnetic field lines are generated. That is, an electromotive force is generated such that an electric current flows from the terminal 20*a* to the terminal 21*a*, of the first coil 3*a*. Furthermore, in the second coil 3*b*, an electric current flows in the direction in which the downward magnetic field lines are generated. That is, an electromotive force is generated such that an electric current flows from the terminal 21*b* to the terminal 20*b*, of the second coil 3*b*. Therefore, there are two coils (the first coil 3*a* and the second coil 3*b*) that are connected in series and generate an electromotive force of the same polarity existing between the output terminal 22*a* and the output terminal 22*b*, and the sum of the voltages of the electromotive forces of both coils are to be generated between the output terminal 22*a* and the output terminal 22*b*. In this case, the output terminal 22*a* is negative and the output terminal 22*b* is positive in polarity.

That is, by setting the winding direction of the first coil 3*a* and the second coil 3*b* and the connection relationship between the terminals of the first coil 3*a* and the second coil 3*b* such that the electric currents generated in the first coil 3*a* and the second coil 3*b* are in the same direction during vibration of the diaphragms, it is possible to have the sum of each of the electromotive forces in the first coil 3*a* and the second coil 3*b* as the output voltage. As a result, the power generation efficiency can be increased.

In the embodiment described above, as illustrated in FIG. 1A, it is described by referring to the example where the coil 3 and the magnet 4 are disposed in parallel in a positional relationship where respective central axes C are aligned. However, the coil 3 and the magnet 4 may be in a positional relationship where the respective central axes C are not aligned. This point will be described by referring to FIG. 4 through FIG. 6.

The central axis C is the central axis in terms of the magnetic force characteristics (for example, in the case of a magnet, the axis of the center of gravity of the magnetic flux). In the example of FIG. 1A, since the coil 3 is in an annular shape, the central axis C thereof is a straight line extending in a perpendicular direction to the annular plane passing through the center of the annular shape, and since the magnet 4 is in a cylindrical shape, the central axis C thereof is the axial line of the cylinder.

Figure 4:
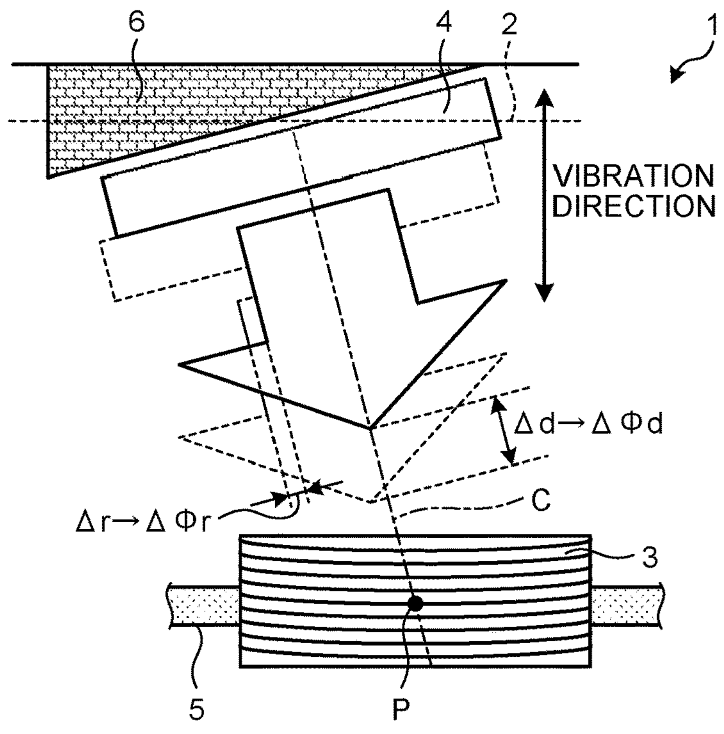
FIG. 4 is a diagram illustrating an example of a configuration of a power generation device according to a modification example.
Figure 5:
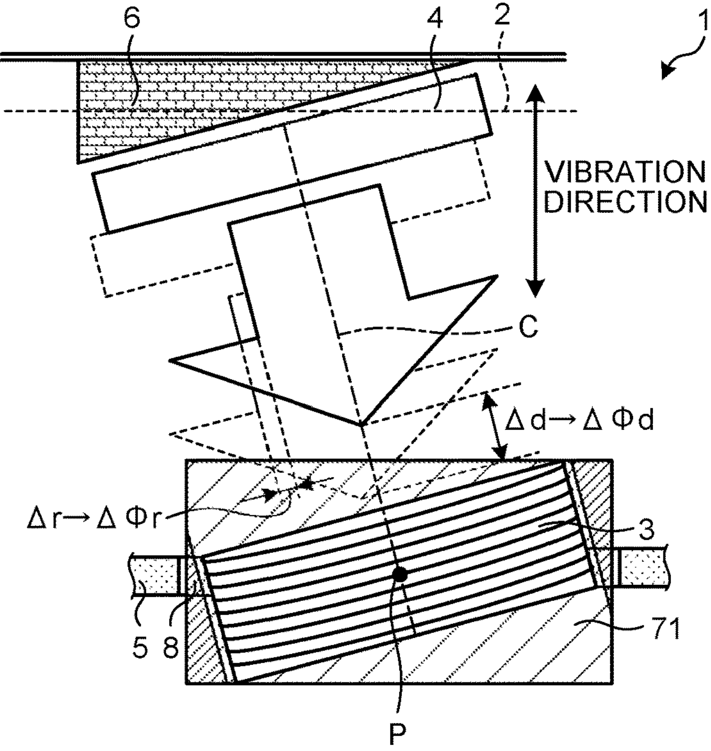
FIG. 5 is a diagram illustrating an example of the configuration of the power generation device according to the modification example.
Figure 6:
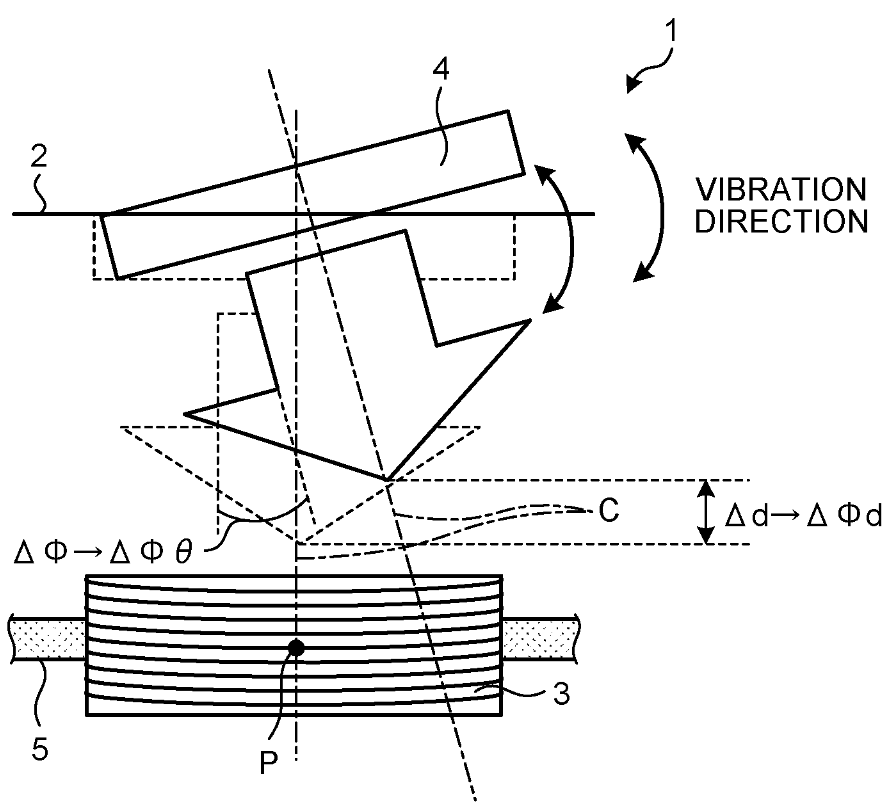
FIG. 6 is a diagram illustrating an example of the configuration of the power generation device according to the modification example.

FIG. 4 through FIG. 6 are diagrams illustrating examples of the configuration of the power generation device 1 according to a modification example. FIG. 4 through FIG. 6 illustrate the example of a case where the magnet 4 is placed on the diaphragm 2, and the coil 3 is fixed to the fixing plate 5.

In FIG. 4 through FIG. 6, the diaphragm 2 and the magnet 4 when the diaphragm 2 is in a reference state (state where no sound wave is applied) are illustrated with solid lines, and the diaphragm 2 and the magnet 4 after shifted from the reference state (state where sound waves are applied) are illustrated with broken lines.

First, FIG. 4 illustrates an example in which the magnet 4 is fixed to the diaphragm 2 while being inclined with respect to the coil 3.

As illustrated in FIG. 4, the magnet 4 is fixed to an inclined face (inclined with respect to the diaphragm 2) of a spacer 6 that is fixed to the diaphragm 2. In other words, the spacer 6 has a structure in which a fixing face to the magnet 4 is inclined with respect to a fixing face to the diaphragm 2. Specifically, the spacer 6 is in a shape that is an obliquely cut shape of a cylinder having the same diameter as that of the magnet 4. The magnet 4 is fixed to a face of the spacer 6, which is not the cut face, and the cut face of the spacer 6 is fixed to the diaphragm 2.

The inclination angle of the spacer 6 (inclination angle of the magnet 4) is set such that the axial line of the central axis of the magnet 4 passes through a center of gravity P of the coil 3 when the diaphragm 2 is in the reference state. This makes it possible to be in a symmetrical state with respect to movement of the diaphragm 2 in both up and down directions.

Thereby, the central axis C of the magnet 4 comes to be displaced with respect to the vibration direction of the diaphragm 2. That is, the facing direction of the central axis C of the magnet 4 is different from the vibration direction of the diaphragm 2.

In other words, the coil 3 and the magnet 4 are in a positional relationship where the central axes thereof are not aligned. Then, when the diaphragm 2 vibrates, the magnet 4 changes its position in the vibration direction in an inclined state. As a result, as for the coil 3, the central axis of the magnetic flux is displaced with respect to the central axis of the coil 3.

Specifically, as illustrated in FIG. 4, the coil 3 is displaced from the center axis by $\Delta r$ in the plane direction of the magnet 4 due to the vibration of the diaphragm 2. As a result, a change $\Delta\varphi r$ in the magnetic flux occurs due to the displacement by $\Delta r$.

As illustrated in FIG. 4, the distance between the magnet 4 and the coil 3 changes by $\Delta d$ in association with the vibration of the diaphragm 2. As a result, a change $\Delta\varphi d$ in the magnetic flux occurs due to the change by $\Delta d$.

As described, by causing the changes of $\Delta\varphi r$ and $\Delta\varphi d$ in the magnetic flux passing through the coil 3 and increasing the flux change, the generation voltage can be increased. That is, the power generation efficiency can be increased.

Next, FIG. 5 illustrates an example in which the coil 3 and the magnet 4 are fixed while being inclined with respect to the diaphragm 2. Specifically, the magnet 4 is fixed to the face of the spacer 6 inclined with respect to the diaphragm 2. In other words, the spacer 6 has a structure in which a fixing face to the magnet 4 is inclined with respect to a fixing face to the diaphragm 2. Specifically, the spacer 6 is in a shape that is an obliquely cut shape of a cylinder having the same diameter as the magnet 4. The magnet 4 is fixed to a face of the spacer 6, which is not the cut face, and the cut face of the spacer 6 is fixed to the diaphragm 2.

Furthermore, the coil 3 is fixed to a fixing hole 71 of a spacer 7 inclined with respect to the fixing plate 5 (that is, the diaphragm 2).

Specifically, the spacer 7 has the fixing hole 71 through and to which the coil 3 is inserted and fixed, and the fixing hole 71 is a hole inclined with respect to the thickness direction of the fixing plate 5. Therefore, by fixing the spacer 7 in form where the plane direction is aligned with the fixing plate 5 and by inserting and fixing the coil 3 in the fixing hole 71 of the spacer 7, the coil 3 is fixed to the diaphragm 2 in a state where the coil plane and the diaphragm plane are inclined.

Furthermore, the spacer 7 (fixing hole 71) is formed such that the coil 3 is substantially parallel to the magnetic pole faces of the magnet 4. Moreover, the coil 3 and the magnet 4 are disposed such that the central axes thereof are aligned with each other, when the diaphragm 2 is in the reference state. In other words, those are disposed such that the central axis C of the magnet 4 passes through the center of gravity P of the coil 3, when the diaphragm 2 is in the reference state.

Thereby, the central axes of the coil 3 and the magnet 4 are displaced with respect to the vibration direction of the diaphragm 2, and the facing directions of the central axes of the coil 3 and the magnet 4 come to be the same.

Then, when the diaphragm 2 vibrates, the magnet 4 changes its position in the vibration direction in an inclined state. As a result, the positional relationship of the coil 3 and the magnet 4 changes while the parallel relationship is being maintained about the respective central axes thereof. Specifically, a $\Delta r$ change (misalignment) occurs in the magnet 4 in the plane direction of the magnetic pole faces due to the vibration of the diaphragm 2.

As a result, a change $\Delta\varphi r$ in the magnetic flux occurs due to the displacement by $\Delta r$.

Furthermore, as illustrated in FIG. 5, the distance between the magnet 4 and the coil 3 changes by $\Delta d$ in association with the vibration of the diaphragm 2. As a result, a change $\Delta\varphi d$ in the magnetic flux occurs due to the change by $\Delta d$. As described, by causing the changes of $\Delta\varphi r$ and $\Delta\varphi d$ in the magnetic flux passing through the coil 3 and increasing the flux change, the generation voltage can be increased. That is, the power generation efficiency can be increased.

Next, FIG. 6 illustrates an example in which one end of the diaphragm 2 is fixed. Specifically, one end of the diaphragm 2 is fixed by being sandwiched by a reinforcement plate 9. The reinforcement plate 9 is a plate-shaped member configured with a rigid resin material or metal material, for example. In such a case, when the diaphragm 2 receives sound waves, the other end of the diaphragm 2 vibrates in the rotational direction (vibration direction) with the fixed end being the axis. That is, the other end of the diaphragm 2 oscillates. As a result, the end of the magnet 4 located on the other end side of the diaphragm 2 changes in position in the rotational direction due to the vibration. That is, the magnet 4 also oscillates in response to the vibration of the diaphragm 2. Moreover, the coil 3 and the magnet 4 are disposed such that the central axes thereof are aligned with each other, when the diaphragm 2 is in the reference state. In other words, those are disposed such that the central axis C of the magnet 4 passes through the center of gravity P of the coil 3, when the diaphragm 2 is in the reference state.

Then, the central axis C of the magnet 4 is displaced from the central axis of the coil 3 by the rotation (oscillation) angle associated with the vibration. Specifically, when the diaphragm 2 oscillates by 40, the central axis C of the magnet 4 is displaced from the central axis of the coil 3 by $\Delta\theta$.

As a result, a change $\Delta\varphi\theta$ in the magnetic flux occurs due to the displacement by $\Delta\theta$.

Furthermore, as illustrated in FIG. 6, the distance between the magnet 4 and the coil 3 changes by $\Delta d$ in association with the vibration of the diaphragm 2. As a result, a change $\Delta\varphi d$ in the magnetic flux occurs due to the change by $\Delta d$. As described, by causing the changes of $\Delta\varphi\theta$ and $\Delta\varphi d$ in the magnetic flux passing through the coil 3 and increasing the flux change, the generation voltage can be increased. That is, the power generation efficiency can be increased.

Figure 7:
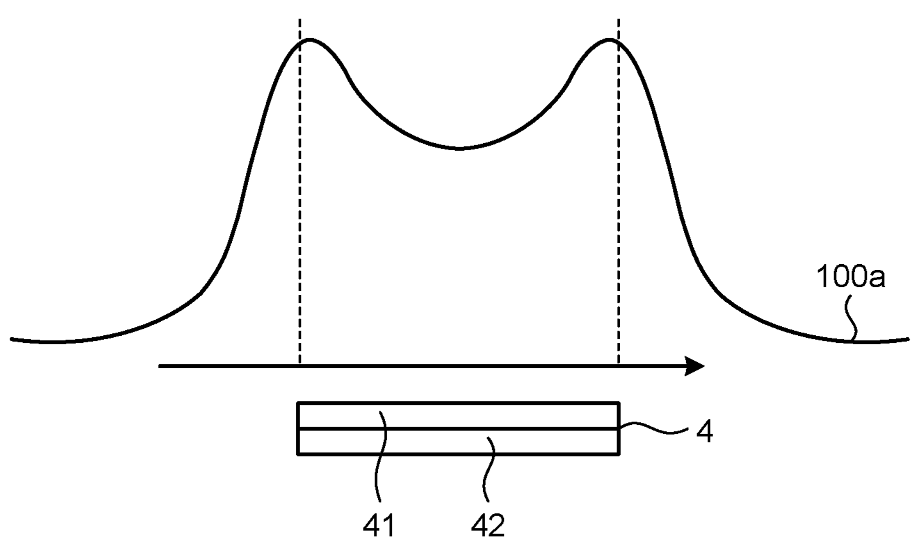
FIG. 7 is a diagram illustrating an example of a configuration of a power generation device according to a modification example.
Figure 8:
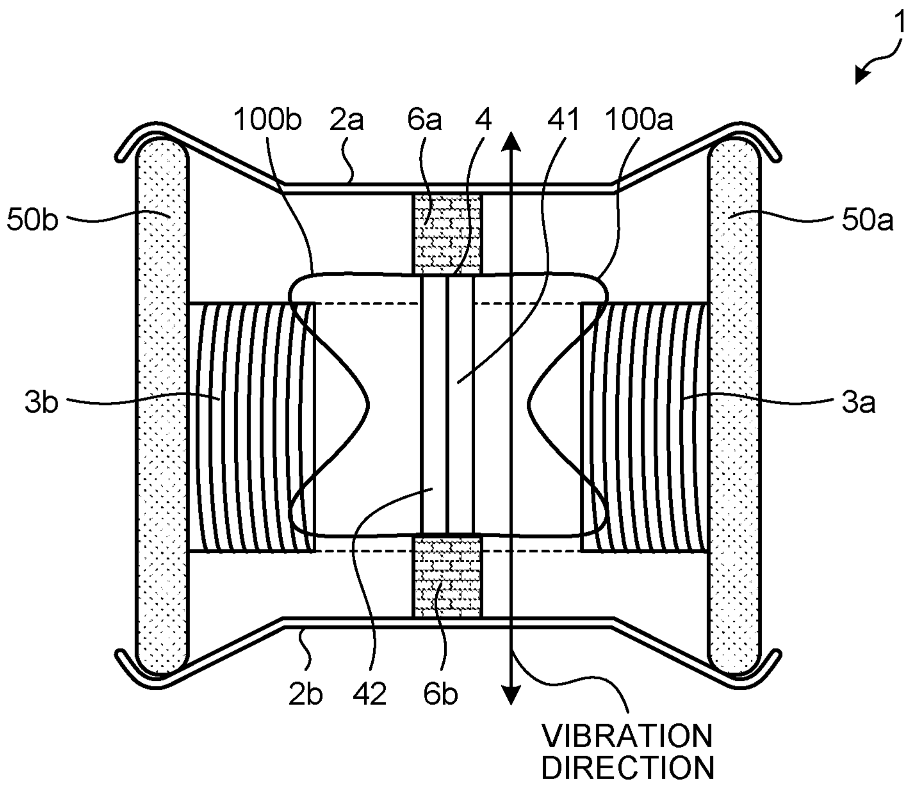
FIG. 8 is a diagram illustrating an example of the configuration of the power generation device according to the modification example.
Figure 9:
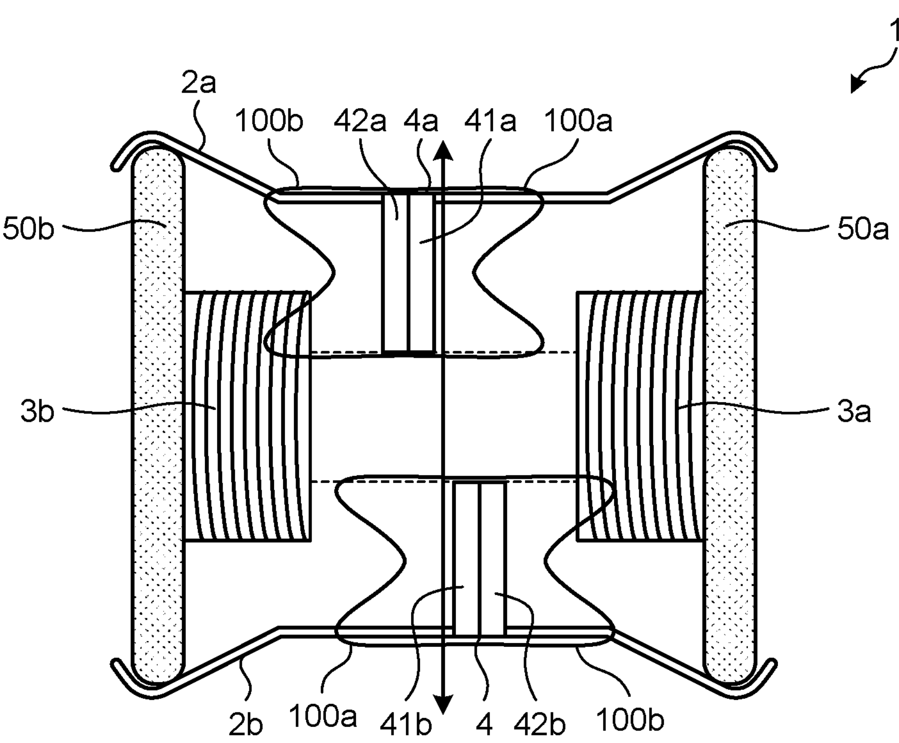
FIG. 9 is a diagram illustrating an example of the configuration of the power generation device according to the modification example.

Next, as another modification example, an example of a configuration that uses the characteristics of the magnetic flux density distribution of the magnet 4 to increase the power generation efficiency will be described by referring to FIG. 7 through FIG. 9. FIG. 7 through FIG. 9 are diagrams illustrating examples of the configuration of the power generation device 1 according to a modification example.

First, the magnetic flux density distribution of the magnet 4 will be described by referring to FIG. 7. In FIG. 7, the upper face of the magnet 4 in the drawing is the N-pole and the lower face is the S-pole, and for clarity, the upper half layer of the magnet 4 is schematically illustrated as a N-pole 41 and the lower half layer as a S-pole 42 (an example of second polarity) (namely, S-pole 42*a* and S-pole 42*b*).

As illustrated in FIG. 7, a magnetic flux density distribution 100*a* on the main face side of the N-pole 41 is generally a bimodal distribution. Specifically, the magnetic flux density distribution 100*a* has a distribution shape where the vicinity of both ends of the magnet 4 in the width direction (perpendicular to the thickness direction) has higher density and the density change therein is also greater. That is, the magnet 4 has a distribution characteristic in which the magnetic flux density is higher in the vicinity of both ends in the width direction than in the center and the change thereof is also greater. Note that the magnetic flux density distribution 100*b* (see FIG. 8) on the main face side of the S-pole 42 also has the same characteristic as the magnetic flux density distribution 100*a* on the main face side of the N-pole 41.

Thus, the power generation device 1 according to the modification example illustrated in FIG. 8 and FIG. 9 focuses on the distribution characteristic and is formed in a configuration in which the coil 3 moves by passing through the vicinity of both ends of the magnet 4 in the width direction where the magnetic flux density is high.

First, the configuration of the power generation device 1 illustrated in FIG. 8 will be described. As illustrated in FIG. 8, the first coil 3*a* is fixed to the center area of a first sidewall 50*a* of the chassis 10 of the power generation device 1, and the second coil 3*b* is fixed to the center area of a second sidewall 50*b* that opposes the first sidewall 50*a* of the chassis 10 using an adhesive or the like.

Note that the first coil 3*a* is fixed to the first sidewall 50*a* such that the normal of an opening face thereof faces the same direction as the normal of the plane of the first sidewall 50*a*. Furthermore, the second coil 3*b* is fixed to second sidewall 50*b* such that the normal of an opening face thereof faces the same direction as the normal of the plane of the second sidewall 50*b*.

Furthermore, the chassis 10 is a square tube with a square cross section, and the outer peripheral edges of the first diaphragm 2*a* and the second diaphragm 2*b* are attached to both opening parts thereof by an adhesive or the like. Thus, the chassis 10 is in a substantially sealed state. The first diaphragm 2*a* and the second diaphragm 2*b* are configured with thin sheets of paper, resin, or the like with moderate rigidity, elasticity, and sealing characteristics suitable for vibration.

The magnet 4 is fixed to the first diaphragm 2*a* and the second diaphragm 2*b* such that the normal of the magnetic pole faces (the main face of the N-pole 41 and the main face of the S-pole 42) is in the same direction as the normal of the opening faces of the first coil 3*a* and the second coil 3*b* (and also the normal of the second coil 3*b*). That is, the magnet 4 is fixed to the first diaphragm 2*a* and the second diaphragm 2*b* such that the magnetic pole faces face the perpendicular direction to the vibration direction of the diaphragm 2. Furthermore, the first coil 3*a* and the second coil 3*b* are placed at positions opposing to the magnetic pole faces of the magnet 4.

The magnet 4 is fixed such that the center area of the magnet 4 is located on a straight line passing through the center area of the opening faces of the first coil 3*a* and the second coil 3*b*, when the first diaphragm 2*a* and the second diaphragm 2*b* are in the reference state (state where no sound wave is applied to the first diaphragm 2*a* and the second diaphragm 2*b*). Furthermore, the size (and shape) of the magnet 4 is determined such that the outer periphery of the opening faces of the first coil 3*a* and the second coil 3*b* opposes the vicinity of the outer periphery of the magnet 4, when the first diaphragm 2*a* and the second diaphragm 2*b* are in the reference state. That is, the position, size, and shape of the magnet 4 as well as the positions of the first coil 3*a* and the second coil 3*b* are determined such that the conductor parts of the first coil 3*a* and the second coil 3*b* are located in an area where the magnetic flux density generated by the magnet 4 is high and the change amount in the magnetic flux density (change amount in the magnetic flux density with respect to the position change amount) is great, when the first diaphragm 2*a* and the second diaphragm 2*b* are in the reference state.

As a specific fixing structure of the magnet 4, the side faces of the magnet 4 are fixed by an adhesive or the like to a first space 6*a* that is fixed to the first diaphragm 2*a* by an adhesive or the like, and to a second spacer 6*b* that is fixed to the second diaphragm 2*b* by an adhesive or the like. Then, the first spacer 6*a* and the second spacer 6*b* are formed into a shape to support the magnet 4 such that the coil 3, the magnet 4, and the like are in the positional relationship as described above. The first spacer 6*a* and the second spacer 6*b* are formed with a resin or the like.

When sound is applied to the power generation device 1 in such a structure (from the above in the drawing), the first diaphragm 2*a* vibrates in the up and down directions in the drawing due to the air pressure fluctuation on the external space side of the first diaphragm 2*a* caused by the sound. Furthermore, when the first diaphragm 2*a* vibrates, the first diaphragm 2*a* causes air pressure fluctuation on the internal space side, and the air pressure fluctuation is transmitted to the second diaphragm 2*b* through the internal space of the chassis 10. Therefore, the second diaphragm 2*b* vibrates as well.

The second diaphragm 2*b* moves due to a force that is applied such that the air pressures in the internal space and the external space of the chassis 10 become the same. Furthermore, since the distance between the first diaphragm 2*a* and the second diaphragm 2*b* is sufficiently short relative to the speed of sound (air pressure propagation speed), the second diaphragm 2*b* vibrates to move in the same direction as the moving direction of the first diaphragm 2*a*.

Therefore, the magnet 4 comes to vibrate in accordance with the vibration of the first diaphragm 2*a* (same displacement direction and displacement amount at the same time), that is, synchronously.

Then, with the structure described above, in the magnet 4, the area where the magnetic flux density is high and the fluctuation (the change amount in the magnetic flux density with respect to the position change) is great vibrates around the points that are the positions of the conductors of the first coil 3*a* and the second coil 3*b*.

Therefore, in the first coil 3*a* and the second coil 3*b*, the area of high magnetic flux density and great fluctuation vibrates as the sound is applied to the first diaphragm 2*a*, thereby achieving efficient power generation.

Next, the configuration of the power generation device 1 illustrated in FIG. 9 will be described. The points that are different from the configuration in FIG. 8 will be described by referring to FIG. 9, and explanations are omitted for those that are same as the configuration in FIG. 8. As illustrated in FIG. 9, a first magnet 4*a* has one end of the outer peripheral edges fixed to the first diaphragm 2*a*.

Specifically, the first magnet 4*a* is fixed to the first diaphragm 2*a* by an adhesive or the like such that the normal of the magnetic pole faces is in the same direction as the normal of the opening faces of the first coil 3*a* and the second coil 3*b*. That is, the first coil 3*a* and the second coil 3*b* are placed at respective positions in both directions opposing to the magnetic pole faces of the first magnet 4*a*.

Furthermore, the first magnet 4*a* is disposed closer to the second coil 3*b* side. Specifically, the first magnet 4*a* is disposed closer to the second coil 3*b* such that the magnetic pole face of a N-pole 41*a* (polarity on the far side from the second coil 3*b*) is located in the center between the first coil 3*a* and the second coil 3*b*.

Furthermore, the first magnet 4*a* is fixed to the first diaphragm 2*a* such that the magnetic pole face end part of the first magnet 4*a* faces the opening face outer peripheral part of the second coil 3*b*, when the first diaphragm 2*a* and the second diaphragm 2*b* are in the reference state.

That is, the conductor part of the second coil 3*b* is located in an area where the magnetic flux density by the first magnet 4*a* is high and the change amount in the magnetic flux density is great, when the first diaphragm 2*a* and the second diaphragm 2*b* are in the reference state.

Furthermore, a second magnet 4*b* has one end of the outer peripheral edges fixed to the second diaphragm 2*b*. Specifically, the second magnet 4*b* is fixed to the second diaphragm 2*b* by an adhesive or the like such that the normal of the magnetic pole face is in the same direction as the normal of the opening faces of the first coil 3*a* and the second coil 3*b*. That is, the first coil 3*a* and the second coil 3*b* are placed at respective positions in both directions opposing to the magnetic pole faces of the second magnet 4*b*.

Furthermore, the second magnet 4*b* is disposed closer to the first coil 3*a* side. Specifically, the second magnet 4*b* is disposed closer to the first coil 3*a* such that the magnetic pole face of a N-pole 41*b* (polarity on the far side from the first coil 3*a*) is located in the center between the first coil 3*a* and the second coil 3*b*.

Furthermore, the second magnet 4*b* is fixed to the second diaphragm 2*b* such that the magnetic pole face end part of the second magnet 4*b* faces the opening face outer peripheral part of the first coil 3*a*, when the first diaphragm 2*a* and the second diaphragm 2*b* are in the reference state.

That is, the conductor part of the first coil 3*a* is located in an area where the magnetic flux density generated by the second magnet 4*b* is high and the change amount in the magnetic flux density is great, when the first diaphragm 2*a* and the second diaphragm 2*b* are in the reference state.

When sound is applied to the power generation device 1 in such a structure (from the above in the drawing), the first diaphragm 2*a* vibrates in the up and down directions in the drawing due to the air pressure fluctuation on the external space side of the first diaphragm 2*a* caused by the sound. Furthermore, when the first diaphragm 2*a* vibrates, the first diaphragm 2*a* causes air pressure fluctuation on the internal space side, and the air pressure fluctuation is transmitted to the second diaphragm 2*b* through the internal space of the chassis 10. Therefore, the second diaphragm 2*b* vibrates as well.

The second diaphragm 2*b* moves due to a force that is applied such that the air pressures in the internal space and the external space of the chassis 10 become the same. Furthermore, since the distance between the first diaphragm 2*a* and the second diaphragm 2*b* is sufficiently short relative to the speed of sound (air pressure propagation speed), the second diaphragm 2*b* vibrates to move in the same direction as the moving direction of the first diaphragm 2*a*.

Therefore, the first magnet 4*a* comes to vibrate in accordance with the vibration of the first diaphragm 2*a* (same displacement direction and displacement amount at the same time), and the second magnet 4*b* comes to vibrate in accordance with the vibration of the second diaphragm 2*b*. That is, the first magnet 4*a* and the second magnet 4*b* come to vibrate synchronously.

Then, with the structure described above, in the first magnet 4*a*, the area where the magnetic flux density is high and the fluctuation (the change amount in the magnetic flux density with respect to the position change) is great vibrates around the point that is the position of the conductor of the second coil 3*b*.

Furthermore, in the second magnet 4*b*, the area where the magnetic flux density is high and the fluctuation (the change amount in the magnetic flux density with respect to the position change) is great vibrates around the point that is the position of the conductor of the first coil 3*a*.

Therefore, in the first coil 3*a* and the second coil 3*b*, the area of high magnetic flux density and great fluctuation vibrates as the sound is applied to the first diaphragm 2*a*, thereby achieving efficient power generation.

When the first magnet 4*a* and the second magnet 4*b* are formed in an annular shape to oppose the wire rings of the first coil 3*a* and the second coil 3*b*, the entire conductors of each of the coils come to be located within the area where the magnetic flux density is high and the fluctuation thereof is great. Therefore, a preferable structure to form and dispose the first magnet 4*a* and the second magnet 4*b* in such a manner is achieved.

Figure 10:
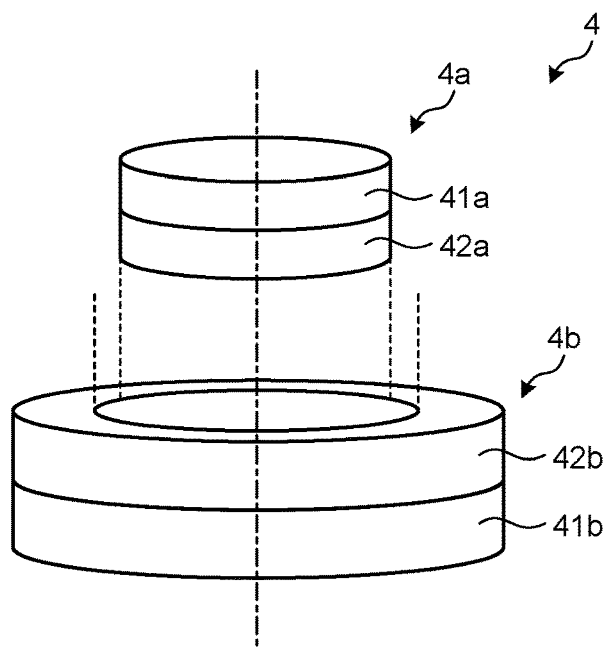
FIG. 10 is a diagram illustrating an example of a configuration of a magnet according to a modification example.
Figure 11:
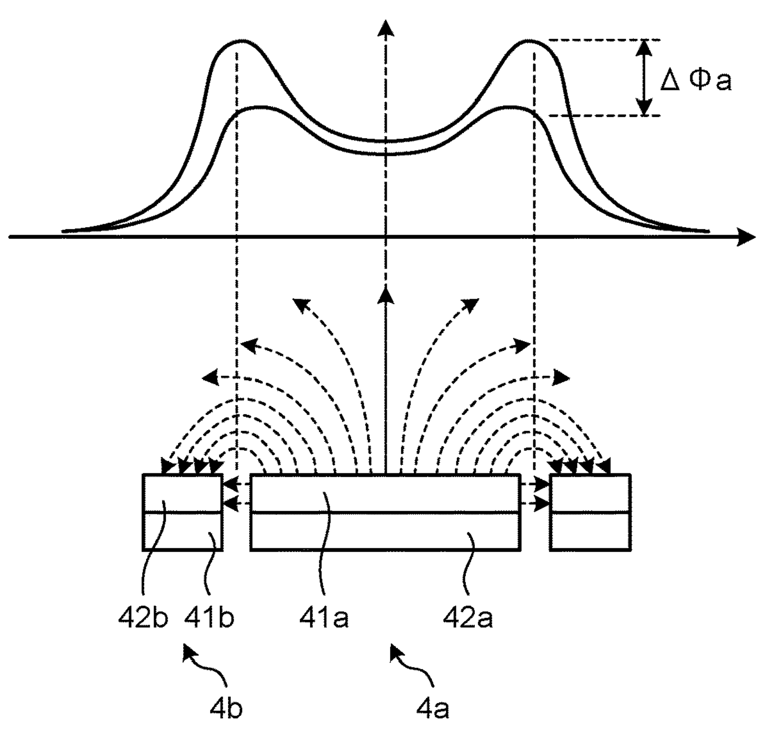
FIG. 11 is a diagram illustrating the example of the configuration of the magnet according to the modification example.

Next, a modification example of the magnet suitable for increasing power generation efficiency will be described. FIG. 10 and FIG. 11 are diagrams illustrating an example of the configuration of the magnet 4 according to a modification example. As illustrated in FIG. 10, the magnet 4 is in a structure including a cylindrical first magnet 4*a* (cylindrical magnet) and an annular second magnet 4*b* (annular magnet), in which the first magnet 4*a* is inserted into the inner diameter hole (circular hole) of the second magnet 4*b*.

Note that the magnetic poles of the first magnet 4*a* are both planes of the cylinder, and the magnetic poles of the second magnet 4*b* are both planes of the circular ring. Furthermore, the first magnet 4*a* and the second magnet 4*b* are formed to be in an integrated structure through insertion such that the polarities of the magnetic poles thereof are opposite.

Also, the first magnet 4*a* and the second magnet 4*b* are bonded by an adhesive, and a slight gap is created by the adhesive. Note that a non-magnetic material such as a resin of appropriate thickness may be interposed between the first magnet 4*a* and the second magnet 4*b*.

FIG. 11 is a diagram illustrating a magnetic flux density distribution on the upper side of the magnetic pole face of the magnet 4 illustrated in FIG. 10.

Since the polarities of the magnetic poles of the first magnet 4*a* and the second magnet 4*b* are opposite on the top faces of the magnets illustrated in the drawing, there are more magnetic field lines that go through the paths between the top face of the first magnet 4*a* and the top face of the second magnet 4*b*. For example, in a structure of the magnet 4 illustrated in the lower part of FIG. 11, there are more magnetic field lines flowing from the N-pole 41*a* of the first magnet 4*a* to an upper-side S-pole face of the second magnet 4*b* through the upper space. Therefore, the magnetic flux density above the boundary face of the first magnet 4*a* and the second magnet 4*b* becomes higher, and the change amount thereof (fluctuation $\Delta\varphi a$ with respect to the position change) becomes also greater.

With the same phenomenon, there are more magnetic field lines that go through the paths between the bottom face of the first magnet 4*a* and the bottom face of the second magnet 4*b*.

Thus, the coil 3 and the magnet 4 of the power generation device 1 are each placed such that the conductor of the coil 3 is located in the area where the magnetic flux density above the boundary face between the first magnet 4*a* and the second magnet 4*b* becomes higher and the change amount thereof becomes also greater.

Such a configuration increases the change in magnetic flux passing through the coil 3 for generating power in the power generation device 1 when sound is applied, thereby making it possible for the power generation device 1 to generate power efficiently.

As described above, the power generation device 1 according to the embodiment includes the coil 3, the magnet 4, and the diaphragm 2. The magnet 4 is provided at a position distant from the coil 3, having magnet pole faces facing a direction of the coil 3. The diaphragm 2 is a vibration plate 2 that vibrates upon receiving sound waves, having either the coil 3 or the magnet 4 being placed. The diaphragm 2 generates power by generating an electromotive force in the coil 3 by the change in the magnetic field of the coil 3 caused by changing the relative position of the coil 3 and the magnet 4 by vibration. This makes it possible to enable efficient power generation.

More effects and modification examples can be easily derived by those skilled in the art. Therefore, the broader aspects of the present invention are not limited by the specific details and representative embodiment expressed and described as above. Thus, various changes are possible without departing from the spirit or scope of the overall concept of the present invention as defined by the appended claims and their equivalents.

The invention claimed is:

1. A power generation device comprising:
- a coil;
- a magnet that is provided at a position distant from the coil and has magnet pole faces facing a direction of the coil; and
- a diaphragm that vibrates upon receiving a sound wave and has either the coil or the magnet placed thereon, wherein;
- the diaphragm comprises a first diaphragm and a second diaphragm, disposed facing each other;
- either one of the coil and the magnet is disposed on the first diaphragm and the second diaphragm, and
- the other one of the coil and the magnet is disposed be ween the first diaphragm and the second diaphragm.

2. The power generation device according to claim 1, wherein a sealed space is formed with the first diaphragm and the second diaphragm.

3. The power generation device according to claim 2, wherein
- the magnet is fixed to a fixing plate that is disposed between the first diaphragm and the second diaphragm, and
- the fixing plate includes a hole part that allows the sealed space to contact both the first diaphragm and the second diaphragm to be an integrated space.

4. The power generation device according to claim 1, wherein the coil and the magnet are placed to be in a positional relationship where respective central axes are not aligned.

5. The power generation device according to claim 4, wherein a facing direction of the central axis of at least one of the coil and the magnet is different from a vibration direction of the diaphragm.

6. The power generation device according to claim 1, wherein the magnet is fixed to the diaphragm to be vibrable, and vibrates in association with vibration of the diaphragm.

7. The power generation device according to claim 1, wherein
- the magnet is fixed to the first diaphragm and the second diaphragm such that the magnetic pole faces face a perpendicular direction to a vibration direction of the diaphragm, and
- the coil is placed at a position opposing the magnetic pole faces of the magnet.

8. The power generation device according to claim 7, wherein the coil is placed at each of positions on both directions opposing the magnetic pole faces of the magnet.

9. The power generation device according to claim 8, wherein
- the magnet is formed with a first magnet placed on one of the first and second diaphragms and a second magnet placed on the other one of the first and second diaphragms,
- the first magnet is fixed to the first diaphragm such that an end part of a magnetic pole face of the first magnet opposes an end part of a magnetic pole face of one of the coils, and
- the second magnet is fixed to the second diaphragm such that an end part of a magnetic pole face of the second magnet opposes an outer peripheral part of an opening face of the other one of the coils.

10. The power generation device according to claim 7, wherein the coil and the magnet are placed at positions where an outer peripheral part of an opening face of the coil opposes a vicinity of an outer peripheral part of a magnetic pole face of the magnet.

11. The power generation device according to claim 1, wherein
- the magnet includes:
  - an annular-shaped magnet; and
  - a cylindrical-shaped magnet that is inserted into a circular hole of the annular-shaped magnet, and
  - polarities are opposite in a magnetic pole face of the annular-shaped magnet and a magnetic pole face of the cylindrical-shaped magnet facing in an identical direction.

* * * * *